United States Patent
Perkins et al.

(10) Patent No.: US 11,951,690 B2
(45) Date of Patent: Apr. 9, 2024

(54) METHOD FOR PROCESSING MASSIVE FIBER-COMPOSITE PREFORMS

(71) Applicant: Arris Composites Inc., Berkeley, CA (US)

(72) Inventors: J Scott Perkins, Oakland, CA (US); Bert D. Mannhalter, Kensington, CA (US); Riley Reese, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 219 days.

(21) Appl. No.: 17/566,141

(22) Filed: Dec. 30, 2021

(65) Prior Publication Data
US 2022/0203630 A1    Jun. 30, 2022

Related U.S. Application Data

(60) Provisional application No. 63/132,803, filed on Dec. 31, 2020.

(51) Int. Cl.
*B29C 65/00* (2006.01)
*B29C 65/02* (2006.01)

(52) U.S. Cl.
CPC ............. *B29C 66/69* (2013.01); *B29C 65/02* (2013.01); *B29C 66/729* (2013.01)

(58) Field of Classification Search
CPC ..... B29C 65/02; B29C 65/48; B29C 65/4815; B29C 66/69; B29C 66/729; B29C 66/7292; B29C 70/20; B29C 70/205; B29C 70/46; B29C 70/541; B29C 70/545; B29B 11/16

USPC ........ 156/60, 166, 180, 182, 196, 199, 200, 156/201, 250, 269, 296, 324
See application file for complete search history.

(56) References Cited

U.S. PATENT DOCUMENTS

| | | | | |
|---|---|---|---|---|
| 5,084,222 A | * | 1/1992 | Glemet | B29C 70/521 264/171.23 |
| 5,540,797 A | * | 7/1996 | Wilson | B29C 70/521 425/114 |
| 5,721,047 A | * | 2/1998 | Thicthener | B29C 33/42 264/145 |
| 2007/0227646 A1 | * | 10/2007 | Yano | B29B 15/122 156/441 |
| 2020/0114596 A1 | * | 4/2020 | Davidson | B29C 65/02 |
| 2020/0361122 A1 | | 11/2020 | Pelman et al. | |
| 2020/0384667 A1 | | 12/2020 | Escowitz et al. | |

OTHER PUBLICATIONS

Authorized Officer: Pierre, Nathalie, International Search Report and Written Opinion issued in PCT application No. PCT/US2021/065726, dated Apr. 21, 2022, 15 pp.

\* cited by examiner

*Primary Examiner* — Philip C Tucker
*Assistant Examiner* — Brian R Slawski
(74) *Attorney, Agent, or Firm* — Kaplan Breyer Schwarz, LLP

(57) ABSTRACT

A method for processing massive fiber bundles includes massive fiber-bundle formation and massive materials handling, wherein plural small-diameter bundles are unified, while more or less preserving their legacy cross-sectional form. It also includes bending, such as to create non-linear preforms, and preform-charge fabrication. Embodiments of the invention operate to help preserve a desired fiber alignment throughout a part fabricated from relatively large-diameter fiber bundles.

19 Claims, 4 Drawing Sheets

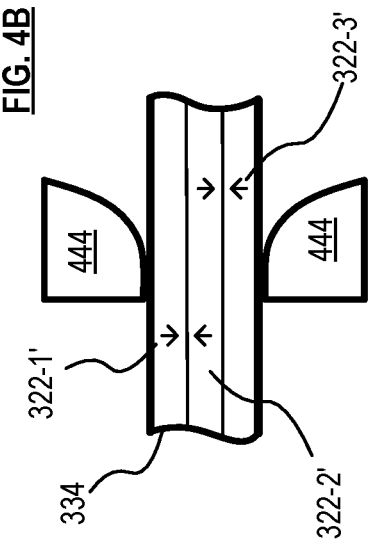
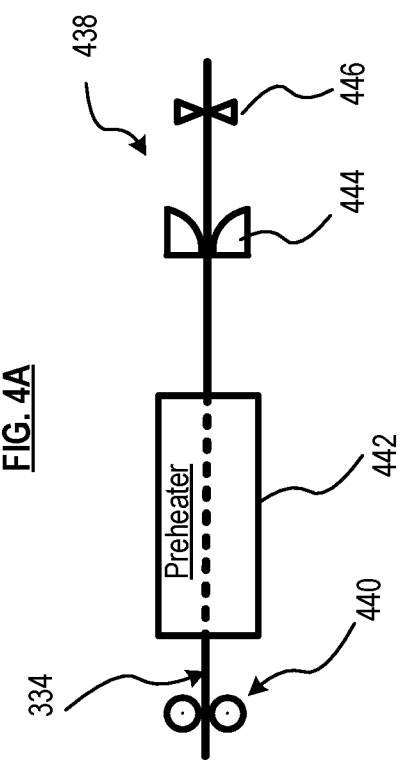
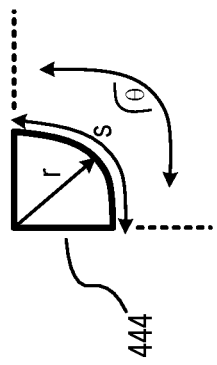
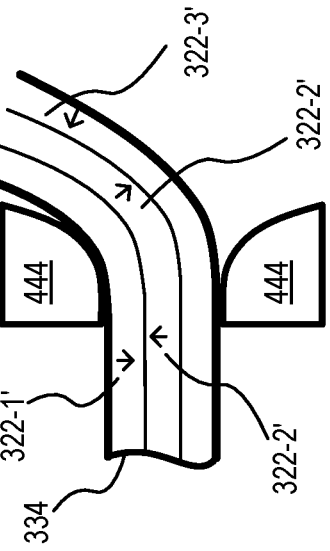
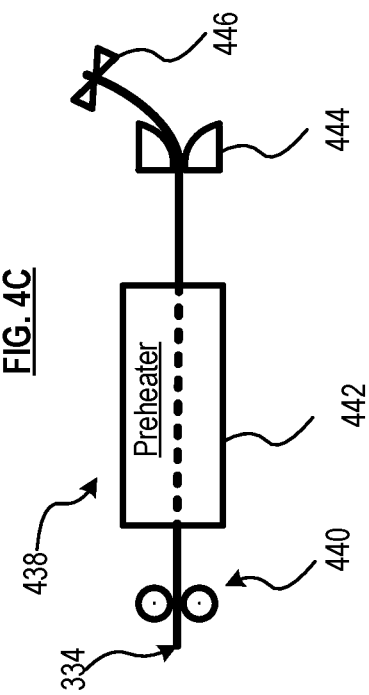

METHOD FOR PROCESSING MASSIVE FIBER-COMPOSITE PREFORMS

FIELD OF THE INVENTION

The present invention relates to the manufacture of fiber-composite parts.

BACKGROUND

When applying a bending moment to beam, normal stresses (i.e., stresses aligned with the lengthwise direction of the beam) arise. Such stresses increase as the length-to-height ratio of the beam decreases. FIGS. 1 and 2 depicts portions of linear beam 100 that is subject to a positive bending moment, which will cause the beam to develop a concave-upward curvature. As a result, upper portion of beam 100 (i.e., the portion above neutral axis 102) experiences compressive stress 104. Conversely, the lower portion of beam 100 (i.e., the portion below neutral axis 102), experiences tensile stress 108. Compressive stress 104 results in compressive strain in beam 100, which in this example, causes buckling 206 along a portion of the innermost bend arc. And tensile stress 108 results in tensile strain in beam 100, causing, in this example, expansion (i.e., thinning) of portion 210 of the outer bend arc.

These primarily geometrically sourced complications introduce numerous challenges to processes that use members having longitudinal profiles and relatively larger thickness/diameters. For example, winding a thick length of towpreg—a resin-infused bundle of fibers—onto a spool for transportation requires a prohibitively large spool diameter. Further, bend radii are constrained by a minimum dimension beyond which the member (fibers) will buckle via compressive stress along its inner bend arc.

When bending isotropic materials, geometric complications are generally resolved by applying force as necessary to appropriately strain the material along the bend arc. The force application can be performed cold, such as for metal rods, or hot, such as for PVC pipes. The resultant strain helps maintain a more constant cross section of the profile through the bent section.

For lengths of anisotropic materials, such as composites, wherein a plurality of fibers may be unidirectionally aligned along their major axis, straining material along a bend arc becomes far more problematic. This is attributable to the low axial strain of the constituent fibers. Rather than plastically straining through a bend in the manner of isotropic materials, the fibers will flatten along the outer arc (via tension) or bunch up along the inner arc (via compression). The flattening and bunching negatively affects performance by misaligning fibers relative to the major axis through the bent section.

SUMMARY

The present invention provides a method for processing towpreg or preforms having a "massive" effective diameter, which is defined for use herein and in the appended claims as a diameter/width of about 3 millimeters (mm) or more.

Towpreg—or more, generally, resin-infused fiber bundles—is the source of material for applicant's fiber-bundle-based preforms, these preforms being the basic feed constituent for applicant's compression-molding processes. For applicant's processes, it is critical that these segments of resin-infused fiber bundle can be shaped into various forms/architectures, and in such a way that they readily nest/abut with other preforms to create assemblages thereof for placement into a mold cavity. It is applicant's use of such fiber-bundle-based preforms, including their ability to be precisely shaped, and organized into assemblages of desired forms, which facilitates the fabrication of composite parts possessing far more ideal fiber alignments than those of the prior art.

The inventors have found, during the processing of towpreg having a diameter in a range of about 0.7-1.8 mm, that fiber flattening and buckling occurs at the location of a bend. However, with attention to the design of bending dies, and judicious selection of bending-process parameters, such effects can be minimized to the point where they have a negligible effect on the performance of parts. But as the diameter of the towpreg approaches 3 mm, the aforementioned design and process considerations have proven to be less effective. Moreover, the fiber deformation present in segments of such processed towpreg (i.e., the preforms) compromises the ability of neighboring preforms to "nest" against one another when grouped in assemblages, due to significant variations in cross-sectional dimensions at the location of bends.

As the use of relatively larger-effective-diameter fiber bundles has become increasingly viable for process efficiency, the need to address these bend-quality issues has become increasingly important. Embodiments of the invention enable the use of such massive material, which reduces the quantity of preforms required for a given part, thus improving process efficiency.

In accordance with the present teachings, embodiments of a method that addresses the aforementioned geometric constraints are applicable to various stages of fiber-bundle-based preform processing. In various embodiments, the method involves: (i) massive fiber-bundle formation, (ii) bending (to create non-linear preforms), and (iii) preform-charge fabrication. The method(s) operates to help preserve a desired fiber alignment throughout a part fabricated from relatively large-effective-diameter (i.e., massive) fiber bundles.

A basic objective of all embodiments of the method is to induce interlaminar shear during bending, rather than generating the strain present during the bending of isotropic materials. Since the fibers cannot strain (i.e., stretch) to an appreciable extent along their long axis, they are instead allowed to displace relative to one another.

Consider two extremes. In one scenario, a massive fiber bundle is formed from a plurality of individual fibers that are grouped together. There is a very large (fiber) interfacial area in this scenario, since individual fibers (or individual resin-impregnated fibers) throughout the massive bundle are abutting one another. During bending of this massive fiber bundle, shear stresses will be readily transferred throughout the bundle from fiber to fiber, preventing the fibers from displacing relative to one another and forcing strain (which they don't do). Rather, the fibers, depending on their location in the bundle and the nature of the stress to which they are exposed, will break and buckle. In a second scenario, plural smaller fiber bundles having a circular cross section are placed adjacent to one another and tacked together to form a single massive fiber bundle. This represents a situation in which there is a reduced fiber interfacial area, with just a small portion of the perimeter of any one of the small bundles abutting that of another small bundle. These smaller bundles, and the fibers within them, are effectively isolated from the other small bundles and transfer a minimal amount of stress to one another, instead promoting displacement of the fiber bundles relative to one another.

In accordance with embodiments of the invention, large-effective-diameter (massive) fiber bundles are formed from plural small-effective-diameter fiber bundles. The aforementioned desirable interlaminar shear and the resulting relative displacement of the small fiber bundles is promoted by creating small-as-acceptable interfaces between the plural small-diameter fiber bundles. These small-as-acceptable interfaces are created by preserving, to a large extent, the cross-sectional shape of the original small-diameter fiber bundles. Thus, rather than forcing fiber to flatten or buckle due to their inability to strain, the small bundles of the massive fiber bundle are instead allowed to displace relative to one another along their major axis (i.e., along their length). To draw an analogy, consider bending a phone book. Instead of tearing or wrinkling, the pages slip past each other.

Furthermore, interlaminar shear is enabled by providing enlarged bending dies having enhanced heat transfer. Once formed in this manner, large-diameter preforms are further processed in accordance with the present teachings to create a preform charge.

Some embodiments of the invention provide a method comprising: placing, in abutting relationship, plural small-diameter fiber bundles, wherein each of the small-diameter fiber bundles abuts at least one other of the small-diameter fiber bundles;

heating the small-diameter fiber bundles to at least a heat deflection temperature of a resin within the small-diameter fiber bundles, but to less than a melting point of the resin;

applying unification pressure to the small-diameter fiber bundles, thereby unifying the plural small-diameter fiber bundles into a single massive fiber bundle while substantially preserving a cross-sectional shape of each of the plural small-diameter fiber bundles; and cooling the massive fiber bundle.

Summarizing, a method, as depicted and described, comprises: (i) placing plural small-diameter fiber bundles in abutting relationship with one another, (ii) heating them to at least a heat deflection temperature of the resin in the small-diameter fiber bundles, (iii) applying unification pressure to the small-diameter fiber bundles, and (iv) cooling the massive fiber bundle Embodiments of the method may further comprise at least one of the following steps, in any (non-conflicting) combination, among others disclosed herein:

preparing the massive fiber bundle for transport.

preparing the massive fiber bundle for transport by cutting the massive fiber bundle into a plurality of first portions.

preheating a segment of one of the first portions to the heat deformation temperature of the resin; and heating the preheated segment while bending the segment in a bending die, thereby forming a first preform with a bend, wherein:
a bending radius of the bending die is should be greater than or about equal to a diameter of the massive fiber bundle, and
a length of the preheated segment is equal to or greater than $r\theta$ ($\pi/180$), where $\theta$ is a bend angle of the segment in degrees, and r is the bending radius of the bending die.

placing two or more of the first preforms in a fixture that organizes the preforms into a geometry of a part to be formed, or a geometry of a portion of the part;

heating the preforms to the heat deflection temperature of the resin in the preforms;

applying pressure to the preforms, wherein the pressure is insufficient to fully consolidate the preforms, thereby forming a preform charge.

placing two or more of the first portions in a fixture that organizes the first portions into a geometry of a part to be formed, or a geometry of a portion of the part;

heating the first portions to the heat deflection temperature of the resin in the first portions; and applying pressure to the first portions, wherein the pressure is insufficient to fully consolidate the first portions, thereby forming a preform charge.

preparing the massive fiber bundle for transport by crimping the massive fiber bundle at intervals enabling the massive fiber bundle to be folded back and forth onto itself.

cutting the crimped massive fiber bundle, resulting in a plurality of second portions of the massive fiber bundle.

preheating a segment of one of the second portions to the heat deformation temperature of the resin; and heating the preheated segment while bending the segment in a bending die, thereby forming a second preform with a bend, wherein:
a bending radius of the bending die is should be greater than or about equal to a diameter of the massive fiber bundle, and
a length of the preheated segment is equal to or greater than $r\theta$ ($\pi/180$), where $\theta$ is a bend angle of the segment in degrees, and r is the bending radius of the bending die.

placing two or more of the second preforms in a fixture that organizes the preforms into a geometry of a part to be formed, or a geometry of a portion of the part;

heating the second preforms to the heat deflection temperature of the resin in the second preforms;

applying pressure to the second preforms, wherein the pressure is insufficient to fully consolidate the preforms, thereby forming a preform charge.

placing two or more of the second portions in a fixture that organizes the second portions into a geometry of a part to be formed, or a geometry of a portion of the part;

heating the second portions to the heat deflection temperature of the resin in the second portions; and applying pressure to the second portions, wherein the pressure is insufficient to fully consolidate the second portions, thereby forming a preform charge.

preparing the massive fiber bundle for transport by, prior to cooling the massive fiber bundle, bending and cutting the massive fiber bundle to form a plurality of preforms, at least some of which preforms include at least one bend.

BRIEF DESCRIPTION OF THE DRAWINGS

FIG. 4A depicts a processing line for forming a preform from a length of massive towpreg formed via the processing shown in FIG. 3A.

FIG. 4B depicts a longitudinal cross section of a segment of massive towpreg prior to processing to form a preform via the processing line of FIG. 4A.

FIG. 4C depicts a preform being formed from a segment of massive towpreg via the processing line of FIG. 4A, wherein the processing line creates a bend in the segment to form the preform.

FIG. 4D depicts a longitudinal cross section of the segment of massive towpreg as its being bent.

FIG. 5 depicts a bending die.

DETAILED DESCRIPTION

Figure 1:
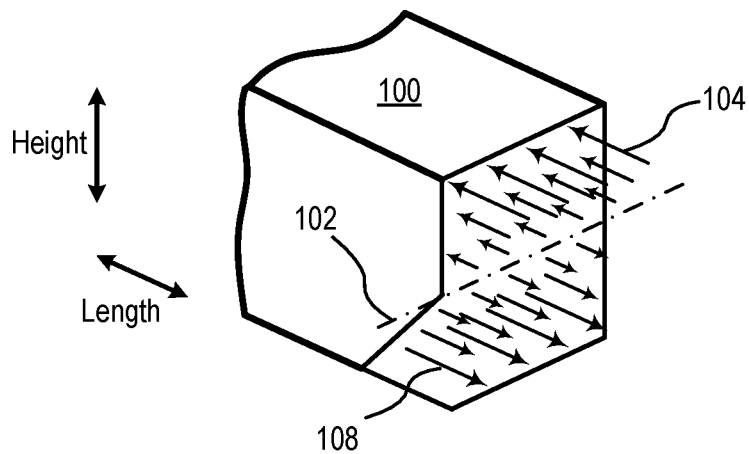
FIG. 1 depicts the compressive and tensile stresses experienced by a beam being bent upwardly.
Figure 2:
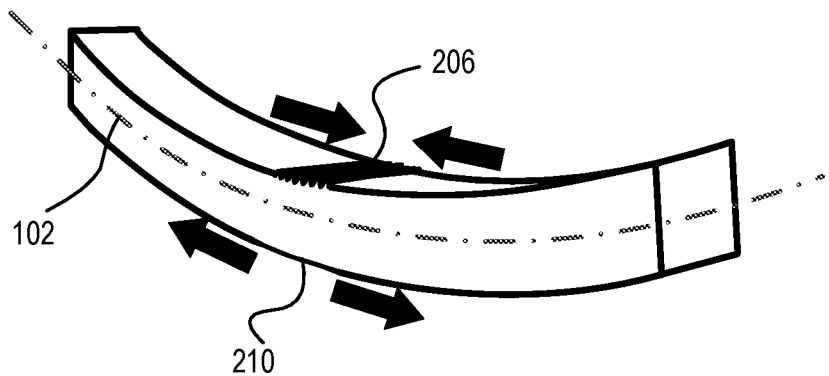
FIG. 2 depicts the compressive and tensile strain in the beam as a result of the stresses depicted in FIG. 1.

Definitions. The following terms are defined for use in this description and the appended claims:

"Fiber" means an individual strand of material. A fiber has a length that is much greater than its diameter.

"Fiber bundle" means plural (typically multiples of one thousand) unidirectionally aligned fibers.

"Small-diameter fiber bundle" means a fiber bundle having a diameter or equivalent transverse cross section of less than 3.0 millimeters.

"Massive fiber bundle" means a fiber bundle having diameter or equivalent transverse cross section of 3.0 millimeters or greater.

"Unification pressure" means a pressure that is: (a) sufficient to result in an adequately unified material (i.e., the unified material will not separate into discrete fiber bundles when dropped), and (b) insufficient to result in excess consolidation so that legacy interfaces are lost, as best evaluated by testing (i.e., if during bending, broken or buckled fibers are observed protruding from the bundle near the inner bend arc, then pressure is excessive). Typically, unification pressure will be 100 psig or less.

"Compatible" means, when used to refer to two different resin materials, that the two resins will mix and bond with one another.

"Tow" means a bundle of unidirectional fibers, ("fiber bundle" and "tow" are used interchangeably herein unless otherwise specified). Tows are typically available with fibers numbering in the thousands: a 1K tow, 4K tow, 8K tow, etc.

"Prepreg" means fibers, in any form (e.g., tow, woven fabric, tape, etc.), which are impregnated with resin.

"Towpreg" or "Prepreg Tow" means a fiber bundle (i.e., a tow) that is impregnated with resin.

"Preform" means a segment of plural, impregnated with resin, unidirectionally aligned fibers. The segment is cut to a specific length, and, in many cases, will be shaped (e.g., bent, twisted, etc.) to a specific form, as appropriate for a specific part being molded. Preforms are usually sourced from towpreg (i.e., the tow-preg is sectioned to a desired length), but can also be from another source of plural unidirectionally aligned fibers (e.g., from a resin impregnation process, etc.). The cross section of the preform, and the fiber bundle from which it is sourced typically has an aspect ratio (width-to-thickness) of between about 0.25 to about 6. Nearly all fibers in a given preform have the same length (i.e., the length of the preform) and, as previously noted, are unidirectionally aligned. The modifier "fiber-bundle-based" is often pre-pended, herein, to the word "preform" to emphasize the nature of applicant's preforms and to distinguish them from prior-art preforms, which are typically in the form of segments of tape or in the form of a shape cut from sheets of fiber. Applicant's use of the term "preform" explicitly excludes any size of shaped pieces of: (i) tape (typically having an aspect ratio—cross section, as above—of between about 10 to about 30), (ii) sheets of fiber, and (iii) laminates. Regardless of their ultimate shape/configuration, these prior-art versions of preforms do not provide an ability to control fiber alignment in a part in the manner of applicant's fiber-bundle-based preforms.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., a press, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Preform Charge" means an assemblage of (fiber-bundle-based) preforms that are at least loosely bound together ("tacked") so as to maintain their position relative to one another. As compared to a final part, in which fibers/resin are fully consolidated, in a preform charge, the preforms are only partially consolidated (lacking sufficient pressure and possibly even sufficient temperature for full consolidation). By way of example, whereas applicant's compression-molding processes are typically conducted at about 1000 to 3000 psi (which will typically be the destination for a preform-charge in accordance with the present teachings) to form a final part, the downward pressure applied to the preforms to create a preform charge is typically in the range of about 10 psi to about 100 psi. Thus, voids remain in a preform charge, and, as such, the preform charge cannot be used as a finished part.

"About" or "Substantially" means +/−20% with respect to a stated figure or nominal value.

In accordance with the present teachings, applicant's fiber-bundle-based preforms are formed from fiber bundles, typically in the form of towpreg, but such bundles may also be sourced from the output of a resin impregnation line. For convenience, the term "fiber bundle" is used hereinafter to refer to both towpreg or the output of a resin impregnation line. Each fiber bundle includes thousands of unidirectionally aligned, resin-infused fibers, typically in multiples of one thousand (e.g., 1k, 10k, 24k, etc.). The fiber bundle may have any suitable cross-sectional shape (e.g., circular, oval, trilobal, polygonal, etc.), but is typically more or less circular.

The individual fibers in the fiber bundles can have any diameter, which is typically, but not necessarily, in a range of 1 to 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing. Furthermore, carbon nanotubes can be used.

Any thermoplastic resin that bonds to itself under heat and/or pressure can be used. Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC).

Embodiments of the invention are directed to the formation of fiber bundles and fiber-bundle-based preforms having a "massive" diameter, previously defined as a diameter greater than or equal to about 3 mm. The massive fiber bundle is formed from plural small-diameter fiber bundles, and the massive preforms are formed from the massive fiber bundles. From an overall process perspective, the formation of massive fiber bundles employs two techniques: (a) multi-bundle unification, and (b) massive materials handling.

Regarding technique (a), the wetting of fiber with resin becomes more difficult as the diameter of a fiber bundle increases, the difficulty primarily attributable to the increased quantity of fibers requiring wet out. This is addressed via applicant's multi-bundle unification technique, wherein multiple small-diameter resin-impregnated fiber bundles are combined into a single massive bundle. For example, six 1.5 mm fiber bundles can be combined into a single, massive fiber bundle having a diameter of about 4 mm.

As indicated above, the multi-bundle unification technique addresses the wet-out problem. But as mentioned in the Background section of this specification, straining a large bundle of fibers along a bend arc is problematic. As previously described, applicant recognized that the multi-bundle unification technique must be conducted in such a way as to promote interlaminar shear during subsequent bending operations. In particular, the multi-bundle unification technique is conducted to substantially preserve the cross-sectional shape of the original small-diameter fiber bundles. The integrity of the plural (i.e., 2 or more) bundles is therefore substantially preserved.

The multi-bundle unification technique processes small-diameter fiber bundles accordingly. Specifically, during the unification process, pressure is carefully monitored. Excess pressure, which is to be avoided, results in too much consolidation and progressive loss of the cross-sectional shape(s) of the original small fiber bundles. But insufficient pressure results in inadequately unified material. The adequacy of the applied pressure can be readily assessed. If the massive fiber bundle separates into discrete bundles when dropped, then the pressure is inadequate. If during bending of the massive fiber bundle, broken or buckled fibers are observed protruding from the bundle at the inner bend arc, then the pressure is excessive. The term "unification pressure" is defined for use herein and the appended claims to mean pressure that is (a) sufficient to result in an adequately unified material (i.e., the unified material will not separate into discrete fiber bundles when dropped), and (b) insufficient to result in excess consolidation so that legacy cross-sectional shapes are substantially lost, as best evaluated by testing (i.e., if during bending, broke/buckled fibers are observed protruding from the bundle near the inner bend arc, then pressure is excessive). Typically, unification pressure will be 100 psig or less.

Fiber-bundle unification is typically accomplished via: (i) a die, or (2) a roller. During die unification, incoming fiber bundles are pulled through a heated die orifice that gradually forces them into a unified form. Roller unification uses a series of roller nips with decreasing gaps and cross sections that apply increasing pressure to unify the fiber bundles. Heating and cooling can be applied by the rollers themselves and/or heat applied can be applied to the material between rollers by external sources (e.g., an IR bulb, hot-air nozzle, etc.)

During unification, the temperature is raised (e.g., by die, rollers, and or external sources) to at least the heat deflection temperature of the resin within the fiber bundle. This permits the smaller bundles to be pressed into one another, with slight deformation of their cross section. The unification pressure required during this phase, as imparted by a die or a roller, is typically in the range of about 1 to 100 psig. Within that range, the greater the number of fiber bundles being unified, the greater the pressure required. So, for example, unifying two bundles might require less than 5 psig, whereas unifying 15 bundles might require about 100 psig.

As long as the resultant massive bundle of fibers is adequately cohesive and of a quality compatible with downstream processes, a variety of different precursor bundles can be unified into the single massive bundle. For example, a fiber bundle having a thermoplastic polyurethane ("TPU") matrix and glass fibers can be unified with a fiber bundle having a polycarbonate ("PC") matrix and carbon fibers. In some other embodiments, glass fiber, carbon fiber, and flax-fiber fiber bundles all having polyamide 6 ("PA6") resin are unified. Furthermore, the small-diameter fiber bundles being unified can have different diameters.

Regarding technique (b)—massive materials handling—as fiber-bundle-diameter increases, so does its minimum curvature metric. This metric describes the smallest curve that the towpreg/preform can conform to under ambient conditions and without undesirable deformation. The relevant consideration is the diameter of the spool onto which the fiber bundle can be wound. For example, a fiber bundle having a diameter of 1 mm can be wound onto a spool have a diameter of about 0.3 meters (1 foot), whereas a fiber bundle having a diameter of 2 mm requires a spool having a diameter of about 0.9 meters (3 feet). As the diameter of the fiber bundle surpasses 3 mm, the minimum diameter required for winding it is impractical and unwieldy from a material-handling standpoint.

In accordance with the present teachings, this problem—which is essentially how to prepare the massive fiber bundle for transfer to downstream processes—is addressed in any of several ways. Namely, a massive fiber bundle can either: (a) be cut into pre-sized lengths, (b) crimped at regular intervals to fold back and forth onto itself, or (c) bent as appropriate to create a preform.

In technique (a), a fiber bundle is either: (i) cut into segments of arbitrary, uniform length, or (ii) cut into lengths corresponding to the lengths of the intended preforms. Technique (a)(i) has the advantage of not requiring prior knowledge of preform length/shapes, while technique (a)(ii) reduces waste from offcuts. Both such techniques are performed right after the massive fiber bundle is formed, thus avoiding the need to spool the material. Rather, the lengths of material are simply placed and/or sorted into containers for transfer.

In technique (b), crimping, heat and pressure are used to compress small regions of segments of a massive fiber bundle at regular intervals. By increasing the aspect ratio (width to thickness) in these sections (i.e., making them relatively flatter and thinner), the material can fold onto itself without breaking fibers. The massive fiber bundle is crimped, repeatedly, at appropriately spaced intervals, enabling it to be folded back and forth onto itself into an appropriately sized container.

In technique (c), and the fiber bundle is formed into a preform, which may including cutting to length as per technique (a)(ii) and bending. It is notable that in embodiments in which linear preforms are used, technique (a)(ii) by itself effectively creates such preforms.

Figure 6:
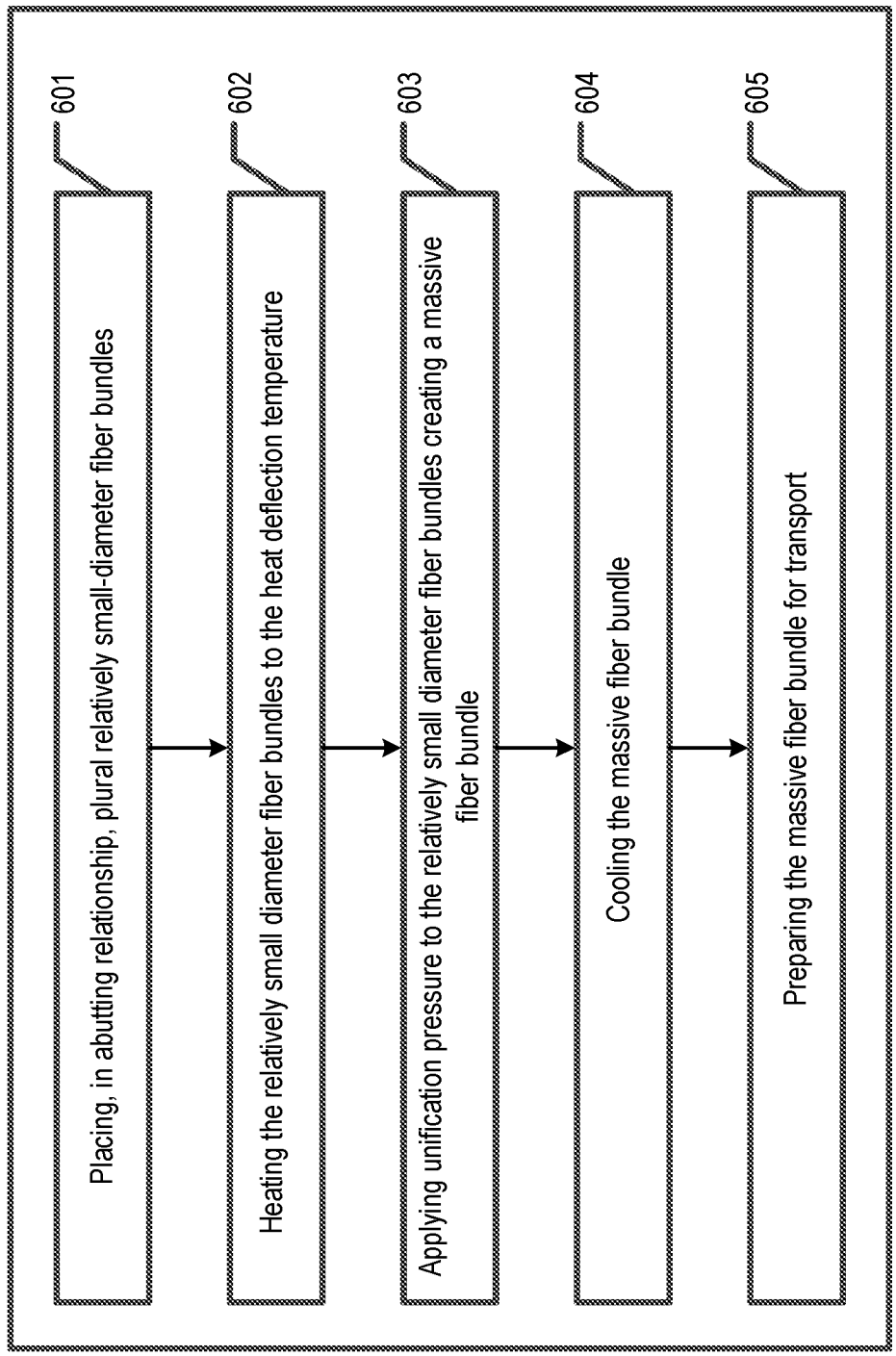
FIG. 6 depicts a method in accordance with the present teachings.

FIG. 6 depicts method 600 in accordance with the present teachings, as explained above.

In operation 601, plural small-diameter fiber bundles are placed in abutting relation. In operation 602, those small-diameter fiber bundles are heated to the heat deflection temperature but less than the melting temperature of the resin in the bundles. In operation 603, which may be conducted concurrently with operation 602, unification pressure is applied to the small-diameter fiber bundles to create a single massive fiber bundle. In operation 604, the massive fiber bundle is cooled, and in operation 605, the massive fiber bundle is prepared for transport, such as via the massive materials handling techniques discussed above.

Figure 3A:
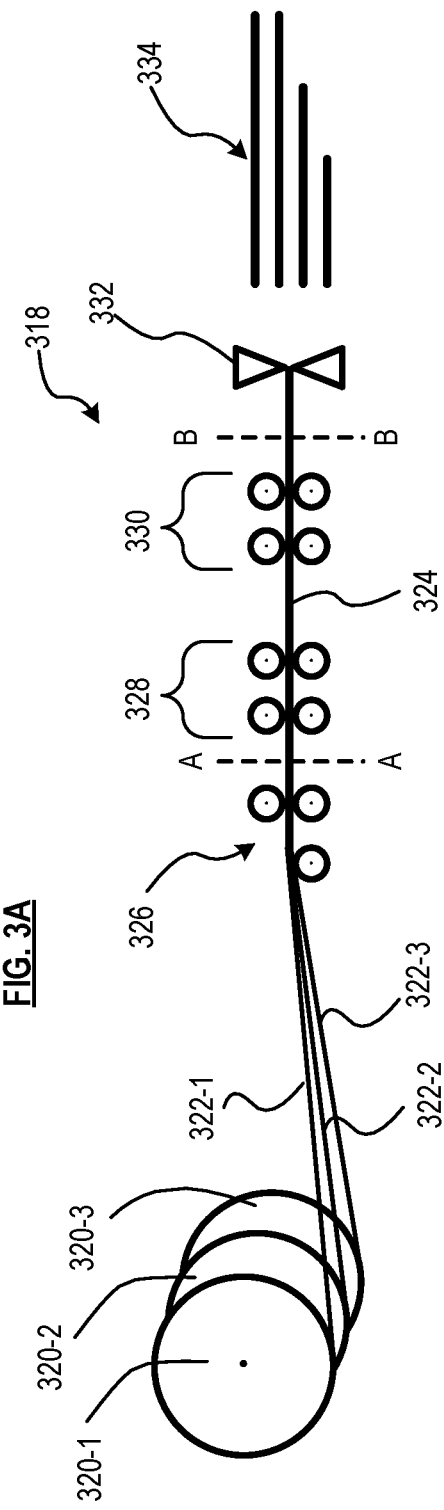
FIG. 3A depicts the processing of plural small-diameter fiber bundles into a single massive fiber bundle in accordance with the present teachings.

FIG. 3A depicts processing line 318 for creating massive fiber bundles. Processing line 318 includes feed rollers 326, heated rollers 328, cooled rollers 330, and cutter 332. In the embodiment depicted in FIG. 3A, processing line 318 unifies, into massive fiber bundle 324, three small fiber bundles 322-1, 322-2, and 322-3, supplied via three spools 320-1, 320-2, and 320-3. The small-diameter fiber bundles each have a diameter less than about 1.5 mm. In the illustrative embodiment, the small fiber bundles are resin impregnated fiber. In some other embodiment (not depicted), the spools carry dry fiber, which is then impregnated with resin via a resin-impregnation processing line, as is known in the art. The impregnated line can be integrated directly into processing line 318.

Feed rollers 326 bring the three fiber bundles 322-1, 322-2, and 322-3 into intimate contact with one another. Rollers 328 heat the fiber bundles, thereby softening them and, at the same time, forcing the individual fiber bundles together. The specific degree of heat and pressure applied yields a coherent larger-diameter fiber bundle 324, but maintains, to a large degree, the cross-sectional shape(s) of each of original fiber-bundle runs 322-1, 322-2, and 322-3. To accomplish this, rollers 328 heat the runs of the small-diameter fiber bundles to a temperature at least that of the heat deflection temperature of the resin in the fiber bundles, but below the melting temperature. As previously noted, the applied pressure is between about 1 psig to 100 psig. Heat may alternatively be applied radiatively, etc., by appropriate heating elements positioned proximal to rollers 328.

After heat and pressure is applied by rollers 328, the now semi-consolidated, massive fiber bundle 324 is cooled via rollers 330. In the embodiment depicted in FIG. 3A, after cooling, massive fiber bundle 324 is sized via cutting unit 332. In the illustrative embodiment, massive fiber bundle 324 is cut into nascent preforms 334 having three different lengths. This is done since the diameter of massive fiber bundle 324 is too large to (practically) spool.

Figure 3C:
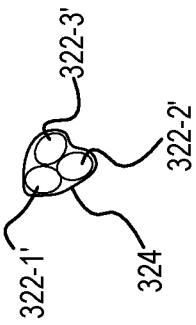
FIG. 3C depicts, for location B in FIG. 3A, a transverse cross section of the fibers being processed.
Figure 3B:
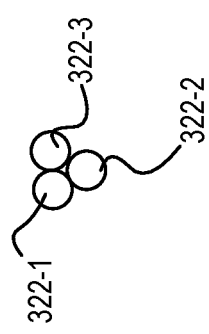
FIG. 3B depicts, for location A in FIG. 3A, a transverse cross section of the fibers being processed.

FIG. 3B depicts a cross section of the material being processed at location A. As depicted in FIG. 3B, each small-diameter fiber bundle 322-1, 322-2, and 322-3 maintains its original form at this point.

FIG. 3C depicts a cross section of the material being processed at location "B," at which point the small-diameter fiber bundles have been semi-consolidated into a single run of massive fiber bundle 324. Yet, as previously noted, cross-sectional shape of the original small-diameter fiber bundles is more-or-less preserved; the now partially consolidated small-diameter fiber bundles being identified as fiber bundles 322-1', 322-2', and 322-3'.

As previously noted, as a first alternative to cutting massive fiber bundle 324 into smaller lengths, it can be repeatedly crimped, so that it can be folded back on itself multiple times. This would require replacing cutter 332 with a crimping station wherein heat and pressure are applied to massive fiber bundle 324 to compress small regions of the massive fiber bundle at regular intervals. This effectively flattens massive fiber bundle 324 at spaced apart discrete regions, enabling it to be folded on itself repeatedly.

In a second alternative to simply cutting massive fiber bundle 324, processing line 318 can be adapted to form bent preforms, such as by incorporating bending dies and grippers (not depicted; see FIG. 4A, etc.). In such an embodiment, preforms are created as soon as massive fiber bundle 324 is formed. It is notable that a preform can be a linear segment. In cases in which massive linear preforms are desired, processing line 318, as depicted in FIG. 3A, is capable of producing such "massive linear preforms." That is, massive fiber bundle 324 is simply cut into desired lengths.

FIG. 4A depicts processing line 438 for processing a precut, massive nascent preform, such as nascent preform 334, as was created via processing line 318 of FIG. 3A. Processing line 438 includes feed rollers 440, preheater 442, bending dies 444, and gripper 446. FIG. 4B depicts a portion of nascent preform 334 in bending dies 444, illustrating the resin-rich legacy interfaces between the partially consolidated bundles 322-1', 322-2', and 322-3'. Reference points (arrows) are depicted at the interfaces between the partially consolidated bundles, showing a reference position of the fibers near the interfaces.

FIG. 4C depicts nascent preform 334 being bent around one of dies 444 of processing line 438. As depicted in FIG. 4D, the reference points have been displaced from one another due to interlaminar shear that occurs along the legacy interfaces during bending. More particularly, the fibers relatively closer to the outer bend arc move more than those relatively closer to the inner bend arc. By facilitating such displacement, as a consequence of the interlaminar shear, the interfaces contribute to the prevention of fiber deformation during bending operations.

In addition to addressing the problem of unacceptably large-diameter spools for massive fiber bundles, embodiments of the invention address an issue related to the dimensions of the die used to bend a large diameter fiber bundle into a desired shape.

The present inventors have found that to promote bend quality, the minimum bending radius of a bending die should be approximately equal to the diameter of the corresponding towpreg. That is, for towpreg having a diameter of 6 mm, the minimum bend radius should be 6 mm. For bend radii below this threshold, fibers tend to buckle on the inner radius and flatten on the outer radius of the bent material. Although the present teachings prevent such defects at appropriate bending radii, their effectiveness decreases below this threshold.

Referring now to FIG. 5, a larger bending radius results, of course, in a larger bend arc length, thus requiring a longer section of fiber bundle for the bending process. For a given bending radius r, and a desired bend angle θ, the arc length s of the bend is given by: rθ (π/180), where θ is in degrees. For example, for a 90-degree bend, a 6 mm bend radius r of die 444 results in bending arc length s of 9.42 mm.

Given spatial and heat-transfer constraints of large fiber bundles, embodiments of the invention tend to heat a longer length of massive fiber than for fiber-bundle-processing techniques in the prior art. Specifically, to raise the relatively longer lengths of massive fiber bundles to appropriate temperatures for bending (i.e., above the heat deflection temperature), the preheating method first elevates an appropriate length of massive fiber bundle to its glass transition temperature in preheater 442, upstream of die 444, as depicted in FIGS. 4A/4C. In the illustrative embodiment, heating is performed via exposure to infrared radiation ("IR") in preheater 442.

Returning to the example of a 90-degree bend and 6 mm bend radius, preheater 442 must be sufficiently long to heat a segment of massive fiber bundle having a length of at least 9.5 mm. With this preheated section of massive fiber bundle fed forward, faster heating at bending die 444 is enabled. In the illustrative embodiment depicted in FIGS. 4A-4D, dies 444 are heated. At the same time, this approach prevents deformation of the massive fiber bundle prior to bending.

Heat transfer during this preheating step can be accomplished in a number of ways other than IR. For example, the segment of massive fiber bundle can be heated via conduction, such as using heated rollers, or via convection, such as by blowing hot air, or via radiation, such as via lasers. These techniques can be used either singly or in any combination, including with IR heating. Also, these heating methods can be used alone or in any combination just after the preheating step in the final heating step for forming a bend, as depicted in FIG. 4C, wherein the material is further heated to a temperature at least slightly above its heat-deflection temperature, after which it is bent to a desired angle.

Preforms having a massive diameter, as formed in accordance with the present teachings, may then be grouped into an assemblage in preparation for placement into a mold. Such an assemblage is referred to herein as a "preform charge."

The preform charge, which is typically a three-dimensional arrangement of preforms, is usually created in a fixture separate from the mold used to form a final fiber-composite part, and which is dedicated and specifically designed for that purpose. To create a preform charge, preforms are placed (either automatically or by hand) in a preform-charge fixture. By virtue of the configuration of the fixture, the preforms are organized into a specific geometry and then tacked together, such as via heating to a temperature that is typically above the heat deflection temperature but below the melting temperature, and then exposed to minimal applied pressure. The shape of the preform charge usually mirrors that of the intended part, or a portion of it, and, hence, the mold cavity (or at least a portion thereof) that forms the part. See, e.g., Publ. Pat. Apps. US2020/0114596 and US2020/0361122, incorporated herein by reference.

As compared to a final part in which fibers/resin are fully consolidated, in a preform charge, the preforms (like the massive fiber bundles from which they are formed in accordance with the present teachings) are only partially consolidated. This is because there is insufficient pressure, and possibly even insufficient temperature for full consolidation. By way of example, whereas applicant's compression-molding processes are often conducted at a pressure of thousands of psi, the downward pressure applied to the constituents to create a preform charge in accordance with the present teachings is typically in the range of about 10 psi to a maximum of about 100 psi. Thus, voids remain in a preform charge, and, as such, the preform charge cannot be used as a finished beam or truss. Although a preform charge is not fully consolidated, the preforms in a preform charge will not move, thereby maintaining the desired geometry and the specific alignment of each preform in the assemblage.

As an alternative to using a preform charge, a layup (having the same configuration as the preform charge) of individual massive preforms is created in a mold cavity. A lay-up is, in fact, the traditional approach for positioning feed constituents in a compression mold. But for both process efficiency as well a substantially greater likelihood that the desired preform alignment is maintained, the use of a preform charge is preferred. As used in this disclosure and the appended claims, the term "assemblage of preforms" means either a "preform charge" or a "layup" of preforms, unless otherwise indicated.

It is to be understood that the disclosure describes a few embodiments and that many variations of the invention can easily be devised by those skilled in the art after reading this disclosure and that the scope of the present invention is to be determined by the following claims.

What is claimed:

1. A method comprising:
   placing, in abutting relationship, plural small-diameter fiber bundles, wherein each of the small-diameter fiber bundles abuts at least one other of the small-diameter fiber bundles;
   heating the small-diameter fiber bundles to at least a heat deflection temperature of a resin within the small-diameter fiber bundles, but to less than a melting point of the resin;
   applying unification pressure to the small-diameter fiber bundles, thereby unifying the plural small-diameter fiber bundles into a single massive fiber bundle while substantially preserving a cross-sectional shape of each of the plural small-diameter fiber bundles;
   cooling the massive fiber bundle; and
   cutting the massive fiber bundle into a plurality of first portions by:
   (a) preheating a segment of one of the first portions of the massive fiber bundle to the heat deflection temperature; and
   (b) heating the preheated segment while bending the segment in a bending die, thereby forming a preform with a bend.

2. The method of claim 1 wherein a bending radius of the bending die is greater than or about equal to a diameter of the massive fiber bundle.

3. The method of claim 2 wherein a length of the preheated segment is equal to or greater than rθ (π/180), where θ is a bend angle of the segment in degrees, and r is the bending radius of the bending die.

4. The method of claim 1 wherein a length of the preheated segment is equal to or greater than rθ (π/180), where θ is a bend angle of the segment in degrees, and r is a bending radius of the bending die.

5. The method of claim 1 comprising:
placing two or more of the preforms in a fixture that organizes the preforms into a geometry of a part to be formed, or a geometry of a portion of the part;
heating the preforms to the heat deflection temperature of the resin in the preforms; and
applying pressure to the preforms, wherein the pressure is insufficient to fully consolidate the preforms.

6. The method of claim 5 wherein the pressure applied to the preforms is less than about 100 psig.

7. The method of claim 1 wherein a diameter of the massive fiber bundle is less than a sum of the diameters of each of the small-fiber diameter bundles.

8. A method comprising:
placing, in abutting relationship, plural small-diameter fiber bundles, wherein each of the small-diameter fiber bundles abuts at least one other of the small-diameter fiber bundles;
heating the small-diameter fiber bundles to at least a heat deflection temperature of a resin within the small-diameter fiber bundles, but to less than a melting point of the resin;
applying unification pressure to the small-diameter fiber bundles, thereby unifying the plural small-diameter fiber bundles into a single massive fiber bundle while substantially preserving a cross-sectional shape of each of the plural small-diameter fiber bundles;
cooling the massive fiber bundle;
cutting the massive fiber bundle into a plurality of first portions;
placing two or more of the first portions in a fixture that organizes the first portions into a geometry of a part to be formed, or a geometry of a portion of the part;
heating the first portions to the heat deflection temperature of the resin in the first portions; and
applying pressure to the first portions, wherein the pressure is insufficient to fully consolidate the first portions.

9. The method of claim 8 wherein the pressure applied to the first portions is less than about 100 psig.

10. The method of claim 8 wherein a diameter of the massive fiber bundle is less than a sum of the diameters of each of the small-fiber diameter bundles.

11. A method comprising:
placing, in abutting relationship, plural small-diameter fiber bundles, wherein each of the small-diameter fiber bundles abuts at least one other of the small-diameter fiber bundles;
heating the small-diameter fiber bundles to at least a heat deflection temperature of a resin within the small-diameter fiber bundles, but to less than a melting point of the resin;
applying unification pressure to the small-diameter fiber bundles, thereby unifying the plural small-diameter fiber bundles into a single massive fiber bundle while substantially preserving a cross-sectional shape of each of the plural small-diameter fiber bundles;
cooling the massive fiber bundle; and
crimping the massive fiber bundle at intervals enabling the massive fiber bundle to be folded back and forth onto itself.

12. The method of claim 11 comprising cutting the crimped massive fiber bundle, resulting in a plurality of first portions of the massive fiber bundle.

13. The method of claim 12 comprising:
preheating a segment of one of the first portions of the massive fiber bundle to the heat deflection temperature; and
heating the preheated segment while bending the segment in a bending die, thereby forming a preform with a bend.

14. The method of claim 13 wherein a bending radius of the bending die is greater than or about equal to a diameter of the massive fiber bundle.

15. The method of claim 14 wherein a length of the preheated segment is equal to or greater than rθ (π/180), where θ is a bend angle of the segment in degrees, and r is the bending radius of the bending die.

16. The method of claim 13 wherein a length of the preheated segment is equal to or greater than rθ (π/180), where θ is a bend angle of the segment in degrees, and r is a bending radius of the bending die.

17. The method of claim 11 wherein a diameter of the massive fiber bundle is less than a sum of the diameters of each of the small-fiber diameter bundles.

18. A method comprising:
placing, in abutting relationship, plural small-diameter fiber bundles, wherein each of the small-diameter fiber bundles abuts at least one other of the small-diameter fiber bundles;
heating the small-diameter fiber bundles to at least a heat deflection temperature of a resin within the small-diameter fiber bundles, but to less than a melting point of the resin;
applying unification pressure to the small-diameter fiber bundles, thereby unifying the plural small-diameter fiber bundles into a single massive fiber bundle while substantially preserving a cross-sectional shape of each of the plural small-diameter fiber bundles;
bending and cutting the massive fiber bundle to form a plurality of preforms, at least some of which preforms include at least one bend; and
cooling the plurality of preforms.

19. The method of claim 18 wherein a diameter of the massive fiber bundle is less than a sum of the diameters of each of the small-fiber diameter bundles.

\* \* \* \* \*